Feb. 2, 1943. M. KALISCHER Re. 22,261

AIR CONDITIONING APPARATUS

Original Filed Nov. 15, 1933 3 Sheets-Sheet 1

WITNESSES:

R. J. Eisinger

E. R. Lutz

INVENTOR

MILTON KALISCHER

BY H. A. Steuer

ATTORNEY

Feb. 2, 1943. M. KALISCHER Re. 22,261

AIR CONDITIONING APPARATUS

Original Filed Nov. 15, 1933 3 Sheets-Sheet 2

WITNESSES:

James K. Mosser

R. J. Eisinger

INVENTOR

MILTON KALISCHER

BY H. A. Steiger

ATTORNEY

Feb. 2, 1943. M. KALISCHER Re. 22,261

AIR CONDITIONING APPARATUS

Original Filed Nov. 15, 1933 3 Sheets-Sheet 3

WITNESSES:

R. J. Eisinger

E. H. Lutz

INVENTOR

MILTON KALISCHER

BY M. Stringer

ATTORNEY

Reissued Feb. 2, 1943 Re. 22,261

UNITED STATES PATENT OFFICE 22,261

AIR CONDITIONING APPARATUS

Milton Kalischer, Longmeadow, Mass., assignor to Westinghouse Electric & Manufacturing Company, East Pittsburgh, Pa., a corporation of Pennsylvania Original No. 2,013,756, dated September 10, 1935, Serial No. 698,205, November 15, 1933. Application for reissue February 7, 1940, Serial No. 317,781

4 Claims. (Cl. 257—9)

My invention relates to a unit air-conditioner, and it has for an object to provide an improved arrangement of the apparatus embodied therein.

A further object is to provide means for draining moisture from the air-cooling fins, a more particular object in this connection being to reduce the extent to which the beads of water collecting at the bottom edges of the fins restrict the air flowing through the passages between the fins.

A further object is to provide a unit air-conditioner having an improved arrangement of removable air filter.

A further object is to provide a mounting for the air circulating fans which provides for quiet operation thereof.

In accordance with my invention, I provide a cabinet having inlets in opposite sides, an outlet in the top, a heat exchanger below the outlet, and propeller fans or blowers for circulating air through said inlets toward the interior. Preferably, a deflector is provided for directing the air upwardly into contact with the heat-exchanger and out through said outlet. A drip pan is located below the air path, for collecting moisture precipitated when cooling and dehumidifying, and excess water when humidifying. A novel arrangement of humidifying the air may also be employed.

I provide a cross-fin coil for cooling and dehumidifying the air, and arrange the lower edges in staggered relation. The beads of water collecting at the bottom edges are thus disposed out of registry, so that the width of the air passage between adjacent fins is reduced by only one bead of water at a time; as distinguished from the restriction of two opposed beads of water where the lower edges are in alignment. The staggered relation is preferably provided by inclining the edges of alternate fins in one direction and the intermediate fins in the opposite direction. The inclined edges provide flow to the corners of the fins to drain the water therefrom.

I provide the cabinet with a top having a shoulder at the outlet, and I dispose an air filter in the outlet resting on the shoulder, and also a grille disposed above the air filter and preferably in the outlet. The top is preferably of sheet metal, the edge portions at the outlet being turned downwardly and inwardly to provide said shoulder.

In mounting the air circulating fans, I provide springs and rubber through which the weight of the fan is transmitted in series. I find that the springs absorb vibration due to the unbalance while the rubber absorbs the alternating current hum. I also provide a felt member for damping the springs.

The above and other objects are effected by my invention as will be apparent from the following description and claims taken in accordance with the accompanying drawings, forming a part of this application, in which:

Figure 1:
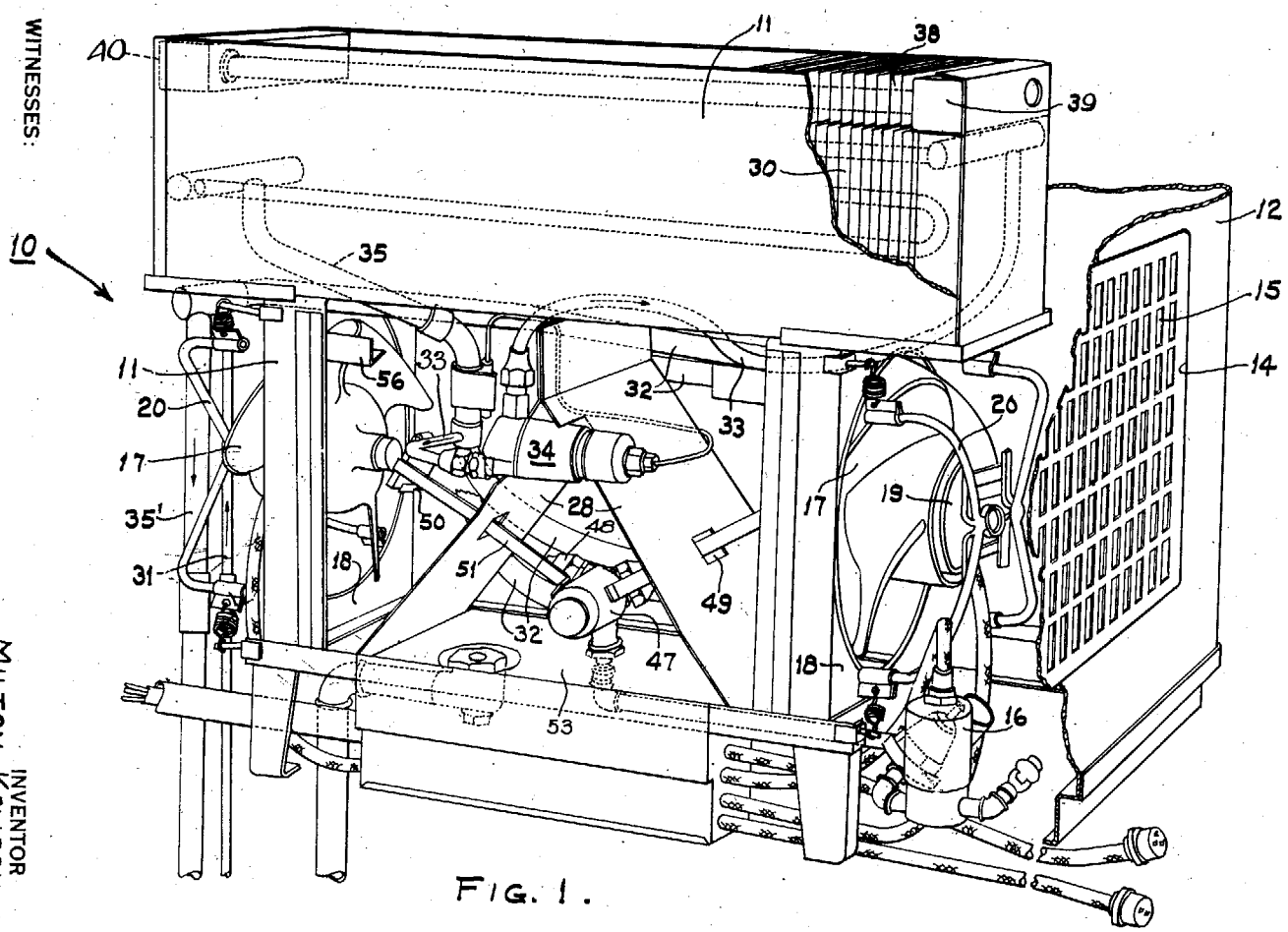
Fig. 1 is a perspective view of the unit air conditioner, with parts broken away to show the apparatus.
Figure 3:
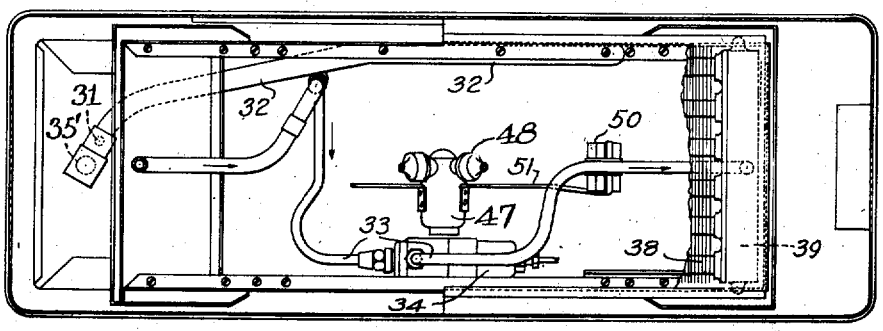
Fig. 3 is a horizontal sectional view with some of the upper parts of the apparatus broken away or removed to show the lower parts.
Figure 2:
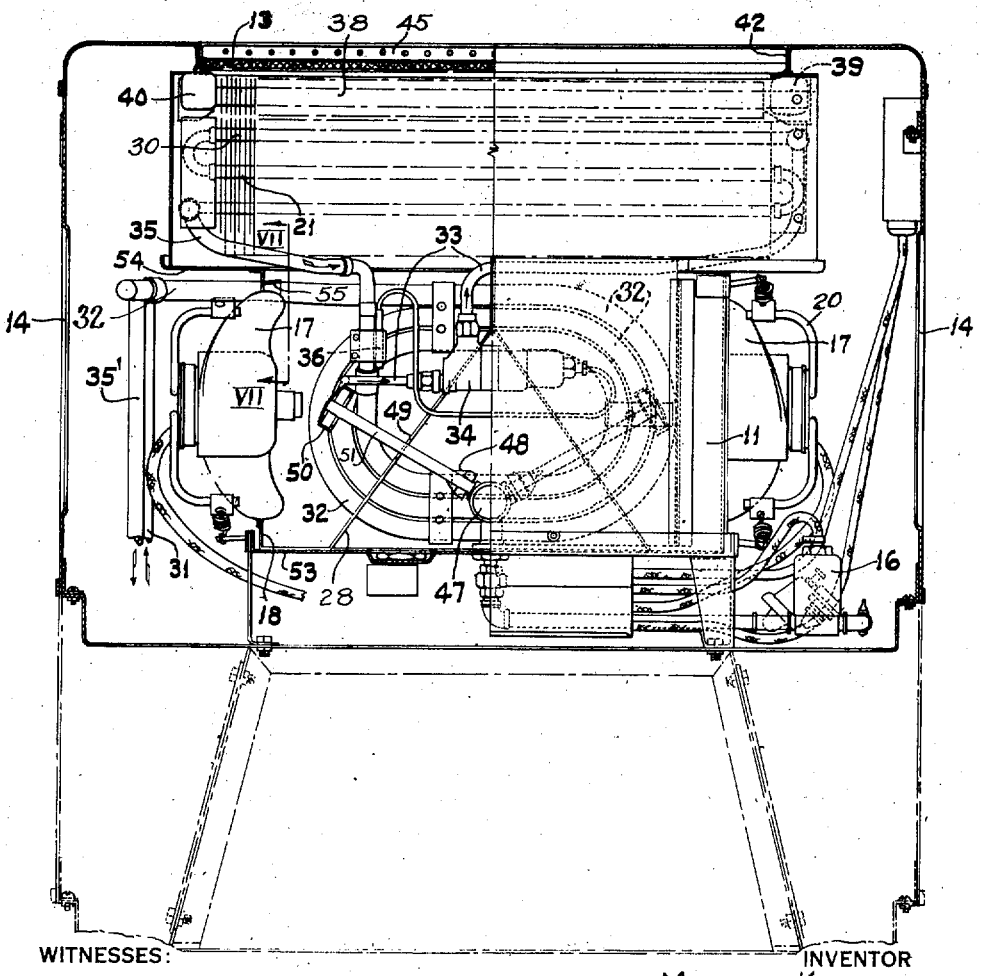
Fig. 2 is a vertical sectional view taken through the outer casing of the cabinet, the left-hand half of the figure also showing the front of the inner casing removed so as to show the parts contained within said inner casing.
Figure 4:
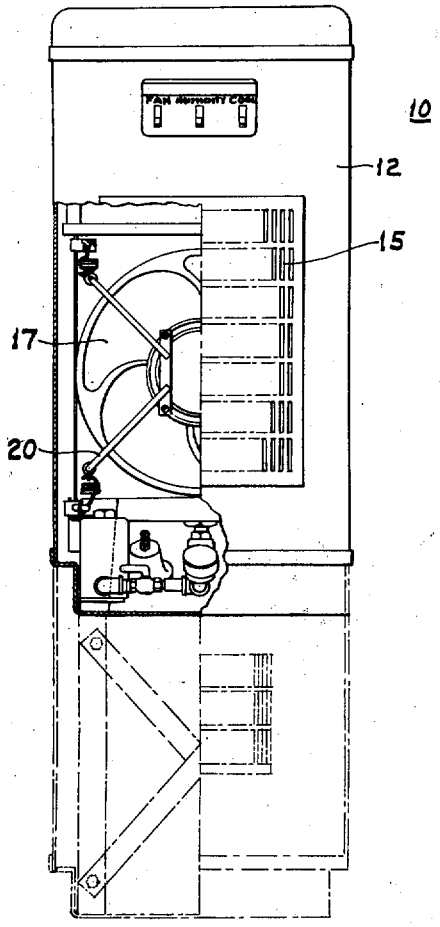
Fig. 4 is an end elevation with parts broken away to show the apparatus in the interior.

Referring now to the drawings more in detail, I show a unit air-conditioner 10, commonly termed a room cooler. The unit comprises an inner casing 11, and a detachable outer casing or shell 12, preferably of sheet metal. The inner casing 11 carries the air-conditioning apparatus with the exception of the air-filter element 13, (Fig. 2), which is carried by the casing 12. The front side of the lower portion of the casing, shown open in Fig. 1, has a vertically slidable closure.

The air-conditioner 10 is adapted to be placed in the room or enclosure to be air-conditioned, and is provided with aligned inlets 14 in opposite sides of the casing 12, through which air from the room is admitted. Grilles 15 are preferably positioned in the inlets and are adapted to be readily removed to provide access to various adjusting mechanisms 16 disposed adjacent one or both inlets, and to the fans for oiling.

Propeller fans or blowers 17 are disposed adjacent the respective inlets, and in openings in end walls 18 of the inner casing, for inducing flow of air through each inlet inwardly toward the opposite inlet. The fans are driven by motors 19, on which they are overhung, the fans being formed with hubs of relatively large diameter, within which the motors are telescoped.

I prefer to mount the fans and motors as shown in Figs. 1, 4, 8 and 9. Radially-extending brackets 20 are secured to the motor 19. The outer end of each bracket extends through the sleeve portion of a clamp or hanger 21, a rubber bushing 22 being inserted therebetween. A pin 23 extends from the inner casing 11, and the hanger is connected thereto through a spring 24. A piece of felt 25 is wrapped around the spring 24. I find that this form of mounting provides for quiet operation of the fan. The rubber absorbs the alternating current hum of the motor and the springs absorb the vibration due to unbalance. The felts damp any vibration in the springs.

A deflector comprising inclined deflector plates 28, arranged to form an inverted V, is located between the fans 17 and serves to deflect the air from the respective fans upwardly. I find that this deflector provides more quiet operation.

A refrigerating evaporator 30 comprising a cross-finned coil is mounted in the inner casing above the fans and the deflector, for cooling the air circulated through the air-conditioner. Liquid refrigerant is supplied through a conduit 31, and conveyed through a heat exchanger 32 comprising a double tube coil, one tube being disposed within the other. The double tube coil is arranged in convolutions in a vertical plane adjacent the rear wall of and within the inner casing. The liquid refrigerant flows through the passage provided by the annular space between the two tubes of the coil. From the heat exchanger 32, the liquid refrigerant is conveyed through a conduit 33, under control of an expansion valve 34, to the evaporator 30. Vaporized refrigerant discharged from the evaporator is conveyed through a conduit 35 to the heat exchanger 32, in which it effects cooling of the liquid refrigerant being supplied, and then to the return or suction conduit 35'. The vaporized refrigerant flows through the inner tube of the heat exchanger coil, its direction of flow being opposite to that of the liquid refrigerant. The expansion valve 34 has a thermal bulb 36 responsive to the temperature of the vaporized refrigerant discharged through the conduit 35.

A heating coil 38 is mounted in the inner casing 11 above the evaporator and adjacent the top wall of the casing 12. It is supplied with heating medium, such as steam, through a header 39, the condensate being discharged through a header 40.

Figure 6:
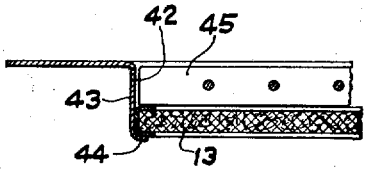
Fig. 6 is an enlarged detail sectional view showing the arrangement of the filter element in the top of the cabinet.

The top wall of the casing 12 is formed with an outlet opening 42 registering substantially with the heating and cooling coils. The filter element 13 is located in the opening 42 for filtering the air discharged therethrough. As shown in Fig. 6, the sheet metal of the top wall is extended downwardly to form a flange 43 and then into the opening to form a flange or shoulder 44 on which the filter element 13 rests. A grille 45 is also disposed in the opening 42 above the filter element and preferably rests thereon. The grille is preferably disposed flush with the top wall.

I also provide means for humidifying the air when the humidity thereof is less than desired. A fitting 47 is disposed between the deflector plates and comprises nozzles 48 which direct streams of water into the air streams transversely thereof, through openings 49 in the deflector plates. Targets 50, made of any suitable erosion-resistant and corrosion-resistant material, such as stainless steel, carborundum, et cetera, are disposed in the air streams and in the path of the water streams, the latter striking against the targets and being finely atomized to facilitate evaporation thereof in the air stream. The targets 50 are preferably mounted on the fitting 47 by straps 51 extending through the openings 49.

A drip pan 53 is disposed beneath the deflector plates 28, the targets 50 and the blowers 17. This drip pan collects the excess water from the spray, which is not evaporated, when the air is being humidified. When the air is being cooled and dehumidified, the precipitation is collected in the drip pan.

Figure 7:
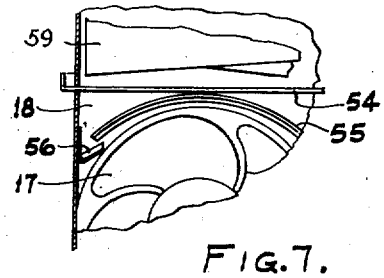
Fig. 7 is a fragmentary sectional view of a detail for draining moisture, taken on the line VII—VII of Fig. 2.
Figure 9:
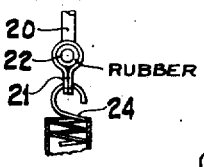
Figs. 8 and 9 are detail views of the spring and rubber mounting for the blowers.
Figure 8:
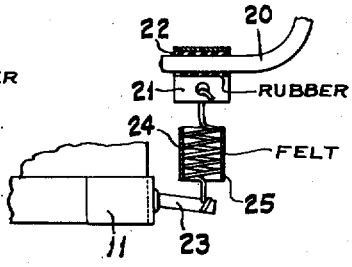

The upper portion of the inner casing 11 is longer than the lower portion containing the fans 17, a bottom wall portion 54 extending from each end of the upper portion to the end wall 18. Condensed moisture collecting on the bottom wall portion 54 flows onto the end wall 18, which is formed with an apron 55 to prevent the moisture from falling directly onto the fan. The apron 55 is in the form of an arc, as shown in Fig. 7, and drains the moisture into troughs 56.

Figure 5:
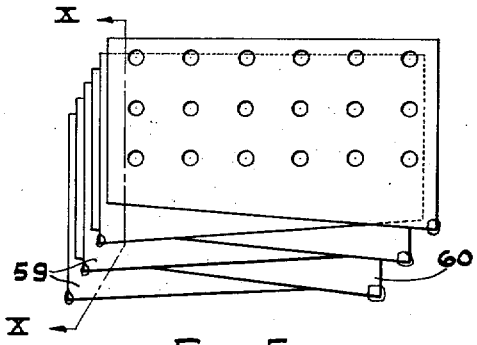
Fig. 5 is a detail perspective view to show the fins of the cooling coil.

As shown in Fig. 5, the fins of the evaporator are formed with inclined lower edges, which inclined edges convey the condensed moisture flowing thereto to the lower corner before it drops from the fins. Inasmuch as the water will readily flow along the lower edge without requiring sufficient accumulation to form drops of water, it will be apparent that the obstruction to air flow is greatly reduced, except only at the lower end of the inclined edge or lower corner of the fin, at which the water forms drops and falls from the fin. With this arrangement, most of the condensed moisture falls at the side of the air stream, and not throughout said stream.

Figure 10:
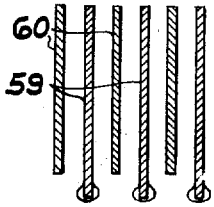
Fig. 10 is a detail section taken on the line X—X of Fig. 5.

Alternate fins 59 are inclined toward one side of the evaporator, while the intermediate fins 60 are inclined toward the opposite side. The alternating arrangement of the inclined edges provides staggering of the edges, as shown in Fig. 10, except at the point where the inclined edges intersect. As shown in Figs. 5 and 10, the beads of water adhering to the lower edges of the fins by capillary attraction are disposed out of registry or alignment. In this way, the width of the air passages between adjacent fins is reduced by only one bead at a time. By providing a greater minimum width of passage, the obstruction to flow of air is reduced.

While I have shown my invention in but one form, it will be obvious to those skilled in the art that it is not so limited, but is susceptible of various changes and modifications without departing from the spirit thereof, and I desire, therefore, that only such limitations, shall be placed thereupon as are imposed by the prior art or as are specifically set forth in the appended claims.

What I claim is:

1. In a unit air-conditioner, the combination of a casing having an outlet in one side and opposed inlets in two opposite sides adjacent the first-mentioned sides, a heat-exchanger disposed within the casing adjacent the outlet, propeller fans positioned with their axes of rotation in alignment with said inlets for effecting flow of air from each inlet inwardly toward the other inlet, a deflector of V-shape, disposed between said fans with the bottom or point of the V toward the outlet, for deflecting the air toward the outlet, the sides of the deflector having openings therein, and a fitting disposed within the V-shaped deflector having nozzles for directing streams of water through said openings into the air streams to humidify the air.

2. A cooling and dehumidifying unit having a plurality of fins arranged in parallel relation, the lower edges of alternate fins being inclined in one direction, the intervening fins being inclined oppositely whereby water flows to the corners of the fins and restriction to air flow by beads of water is minimized.

3. In a room cooler, the combination of an outer casing, an inner casing, an evaporator within the inner casing, means for conveying air through said inner casing and in contact with said evaporator, a heat exchanger, means for conveying liquid refrigerant for said evaporator and vaporized refrigerant exhausted from said evaporator in heat exchanging relation with each other in said heat exchanger, said heat exchanger being disposed in a vertical plane adjacent a vertical wall of and within said inner casing.

4. In a room cooler, the combination of a casing, an evaporator therein, means for conveying air through said casing and in contact with said evaporator, a heat exchanger, means for conveying liquid refrigerant for said evaporator and vaporized refrigerant exhausted from said evaporator in heat exchanging relation with each other in said heat exchanger, said heat exchanger comprising a double tube coil arranged in convolutions in a vertical plane adjacent a vertical wall of said casing.

MILTON KALISCHER.